United States Patent [19]

Takeda

[11] Patent Number: 5,627,451
[45] Date of Patent: May 6, 1997

[54] CONTROL METHOD AND CONTROL APPARATUS FOR SECONDARY BATTERY CHARGING IN CONSTANT CURRENT CHARGING METHOD

[75] Inventor: Yoshiro Takeda, Kawasaki, Japan

[73] Assignee: Fujitsu Limited, Kawasaki, Japan

[21] Appl. No.: 202,506

[22] Filed: Feb. 28, 1994

[30] Foreign Application Priority Data

Apr. 28, 1993 [JP] Japan .................... 5-102407

[51] Int. Cl.⁶ .................... H01M 10/44; H01M 10/46
[52] U.S. Cl. .................... 320/21; 320/35; 320/39
[58] Field of Search .................... 320/21, 20, 22, 320/23, 31, 32, 33, 35, 36, 37, 38, 39, 40, 48

[56] References Cited

U.S. PATENT DOCUMENTS

| | | | |
|---|---|---|---|
| 4,388,582 | 6/1983 | Saar et al. | 320/20 |
| 4,392,101 | 7/1983 | Saar et al. | 320/20 |
| 4,639,655 | 1/1987 | Westhaver et al. | 320/40 X |
| 5,371,453 | 12/1994 | Fernandez | 320/35 X |

FOREIGN PATENT DOCUMENTS

| | | |
|---|---|---|
| 4-190693 | 7/1992 | Japan . |
| 2061643 | 5/1981 | United Kingdom . |

*Primary Examiner*—Edward H. Tso
*Attorney, Agent, or Firm*—Staas & Halsey

[57] ABSTRACT

A method for controlling a secondary battery constant current charging method and a control apparatus therefor, which measures battery voltage (V), a change in battery voltage per unit time ($\Delta V/\Delta t$), a decrease in battery voltage ($-\Delta V$) from a maximum value, battery temperature (T), and/or a change in battery temperature per unit time ($\Delta T/\Delta t$); and stops the battery charging when $\Delta V/\Delta t$ is greater than or equal to a predetermined value after the passage of a predetermined time $t_S$, or when $\Delta V/\Delta t$ and $\Delta T/\Delta t$ are greater than or equal to predetermined values, or when $\Delta V/\Delta t$ and T are greater than or equal to predetermined values, or when V is greater than or equal to a maximum value $V_P$, or when either the $-\Delta V$ or T is greater than or equal to a predetermined value.

4 Claims, 12 Drawing Sheets

CHARGING COMPLETION
BY DETECTING $-\Delta V_x$

MISJUDGE BY
DETECTING $\Delta Tx$

CHARGING COMPLETION BY
DETECTING $\Delta V_{x1}$ AND $\Delta T_x$

CHARGING COMPLETION BY
DETECTING $\Delta V_{x1}$ AND $T_x$

| $T_A$ | $T_1$ | $T_2$ | $T_3$ | $T_4$ | |
|---|---|---|---|---|---|
| $V_p$ | $V_1$ | $V_2$ | $V_3$ | $V_4$ | |

Fig.19

CHARGING COMPLETION BY DETECTING $V_p$

CHARGING COMPLETION BY
DETECTING $-\Delta V_{x_1}$ OR $T_x$

CHARGE COMPLETION BY DETECTING $\Delta V_{x1}$ AND $\Delta T_x$

CONTROL METHOD AND CONTROL APPARATUS FOR SECONDARY BATTERY CHARGING IN CONSTANT CURRENT CHARGING METHOD

BACKGROUND OF THE INVENTION

1. Field of the Invention

The present invention relates to a method for controlling secondary battery charging and a control apparatus therefor. More particularly, the invention relates to a control method and a control apparatus for secondary battery charging, in a constant current charging control method, which detect completion of the battery charging and then stop the battery charging.

2. Description of the Related Art

Constant current charging methods are known for charging a secondary battery in a short time, for example, for charging a secondary battery to nominal capacity in one hour. In this charging method, it is necessary to detect completion of the battery charging process. Various methods are known for detecting the completion of battery charging, for example, as follows:

(a) A method by detecting a decrease in battery voltage from a maximum battery voltage ($-\Delta V$).

(b) A method by detecting an increase in battery temperature per unit time ($\Delta T/\Delta t$).

(c) A method by detecting an increase in battery voltage value per unit time ($\Delta V/\Delta t$).

In the method (a), if a reference value for comparing the value of $-\Delta V$ is set too large, the battery will be overcharged and the battery temperature will increase excessively, thereby shortening the battery life.

In the method (b), if the ambient temperature increases during the battery charging period, the battery temperature will also increase. Therefore, the increased ambient temperature may be inadvertently detected as indicating that the battery is completely charged.

In the method (c), an increase in the battery voltage does not occur only before the battery is completely charged, but also occurs at the start of the battery charging. Therefore, the increased battery voltage at the start of the battery charging may be detected as indicating that the battery is completely charged.

SUMMARY OF THE INVENTION

Therefore, the present invention has as its object the provision of a control method and a control apparatus for charging a battery, which can prevent the battery from being overcharged thus increasing battery life, and which can prevent an erroneous detection of the battery charging being completed before the battery charging is actually completed.

To achieve the above-mentioned object, in a first aspect of the present invention, in the constant current charging method for a secondary battery, a charge in battery voltage per unit time $\Delta V/\Delta t$ is measured after the passage of a predetermined time $t_S$ from the start of the battery charging. When the value of $\Delta V/\Delta t$ is over a predetermined value $\Delta V_{X1}$, it is judged that the battery is completely charged, and the battery charging is stopped. In this aspect of the invention, since the value of $\Delta V/\Delta t$ is not measured when the battery charging is started, a possible error in judging the $\Delta V/\Delta t$ at the start of the battery charging as an indication of the completion of the battery charging is prevented. Therefore, the battery charging can be stopped just before the battery is completely charged, and the battery life can be extended.

In a second aspect of the present invention, in the constant current charging method for a secondary battery, the value of $\Delta V/\Delta t$ and the increased battery temperature value per unit time $\Delta T/\Delta t$ are measured during the battery charging period. When both values $\Delta V/\Delta t$ and $\Delta T/\Delta t$ are greater than or equal to respectively predetermined values $\Delta V_{X1}$, $\Delta T_{X1}$, it is judged that the battery is completely charged, and the battery charging is stopped. In this aspect of the invention, an error in judging the completion of the battery charging due to a change in the ambient temperature or a change in the voltage over time at the start of battery charging can be prevented.

In the third aspect of the present invention, in the constant current charging method for a secondary battery, the value of $\Delta V/\Delta t$ and battery temperature value T are measured during the charging period. When both $\Delta V/\Delta t$ and T are greater than or equal to respectively predetermined values $\Delta V_{X1}, T_X$, it is judged that the battery is completely charged, and the battery charging is stopped. In this aspect of the invention, an error in judging the completion of the battery charging due to a change in the ambient temperature or a change in the voltage over time at a start of battery charging can be prevented.

In the fourth aspect of the present invention, in the constant current charging method for a secondary battery, a plurality of peak battery voltage values $V_P$ during the battery charging period are stored previously into a memory. The stored values of $V_P$ correspond to ambient temperature. Then, the battery voltage V and the ambient temperature $T_A$ are measured during the battery charge period, and when the value of V is over the value of $V_P$, it is judged that the battery is completely charged, and the battery charging is stopped. In this aspect of the invention, the judgment of the completion of the battery charging is not affected by the ambient temperature.

In a fifth aspect of the present invention, in the constant current charging method for the secondary battery, a voltage value $-\Delta V$ decreased from the maximum battery voltage value and the battery temperature value T are measured during the battery charging period. When either $-\Delta V$ or T is greater than or equal to a predetermined value $-\Delta V_X, T_X$, it is judged that the battery is completely charged, and the battery charging is stopped. In this aspect of the invention, by measuring the value of T, the charging can be stopped before the battery is completely charged. Also, if the completion of the battery charging is not correctly detected by measuring T, the battery charging can be stopped by detecting the value of $-\Delta V$. Therefore, overcharging of the battery can be prevented and the battery life can be increased.

BRIEF DESCRIPTION OF THE DRAWINGS

The present invention will be more clearly understood from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
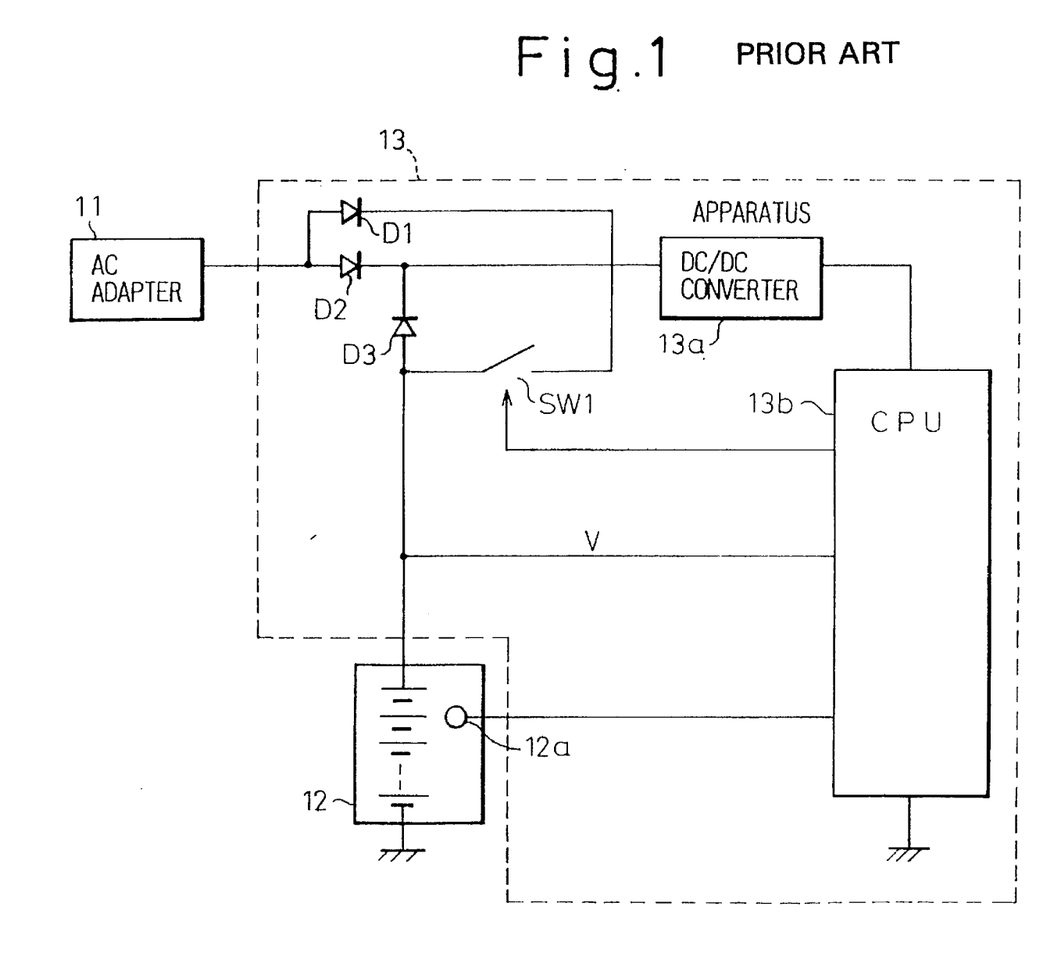
FIG. 1 is a circuit diagram of a conventional secondary battery charging apparatus.

FIGS. 1 is a circuit diagram of a conventional battery charging apparatus for charging a secondary battery, for example, a Ni-Cd (nickel-cadmium) battery, NiMH battery, etc.

DC voltage which is provided from an AC adapter 11 or a secondary battery 12 is provided via diodes D2 or D3 and a DC/DC converter 13a to a CPU 13b in an apparatus 13, for example, a portable personal computer or a portable word processor. On the other hand, the battery 12 is charged by the output of the AC adapter 11 via a diode D1 and a switch SW1 which is closed during the battery charging period. The CPU 13b monitors the voltage and temperature of the battery 12 measured by a sensor 12a, for example, a thermistor. When the battery is completely charged, the CPU 13b opens the switch SW1 to stop the battery charging.

Figure 2:
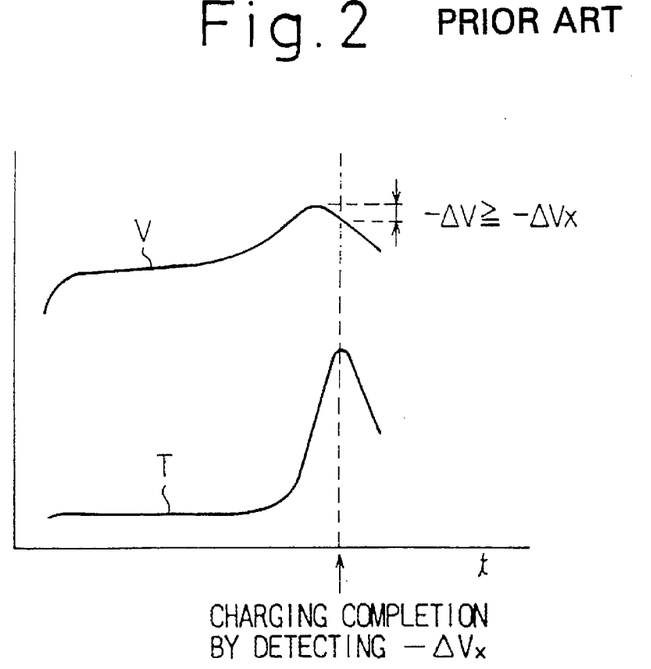
FIG. 2 shows battery charging characteristics of a first known method which detects completion of battery charging by detecting $-\Delta V$.

FIG. 2 shows the battery charging characteristics of the above method (a). In the figure, the abscissa shows time t and the ordinate shows battery voltage (curve V) and battery temperature (curve T). The value of V increases rapidly at the start of the battery charging period, after that the value of V increases slowly as the battery charging proceeds, and increases rapidly again and then decreases just before the battery is completely charged. The temperature T of the battery 12 stays at about the same value for most of the battery charging period, and increases rapidly and then decreases just before the battery is completely charged.

Figure 3:
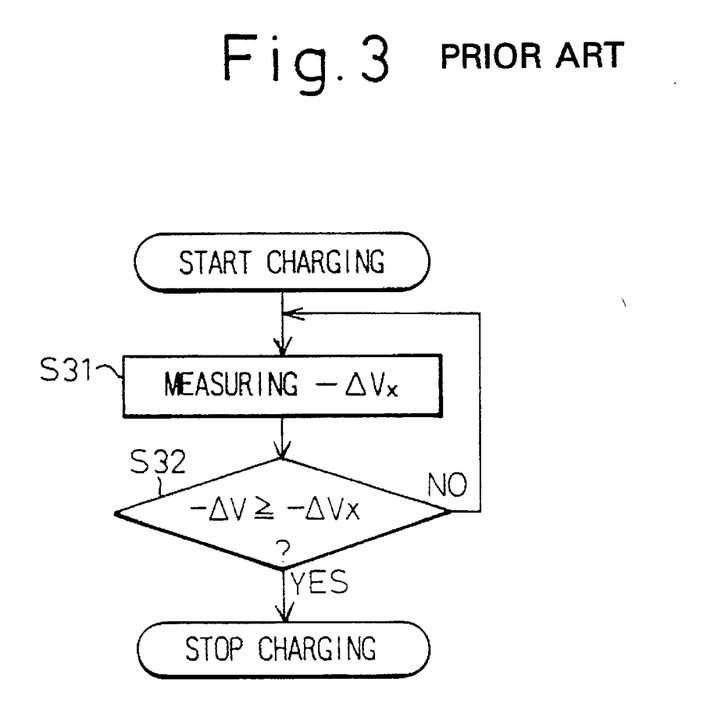
FIG. 3 is a flowchart for explaining a process of the first known method.

This method (a) judges the completion of the battery charging by detecting a phenomenon wherein the battery voltage drops when the battery is completely charged. That is, as shown in the flowchart of FIG. 3, after starting the battery charging, the decrease in battery voltage from the maximum battery voltage, i.e., $-\Delta V$, is measured at a step S31. At a step S32, it is judged whether or not the value of $-\Delta V$ is greater than or equal to a predetermined value $-\Delta V_X$. When the value of $-\Delta V$ is not greater than or equal to the value of $-\Delta V_X$ (NO), the flow returns to the step S31. On the other hand, when the value of $-\Delta V$ is greater than or equal to the value of $-\Delta V_X$ (YES), it is judged that the battery is completely charged, and the battery charging is stopped by opening the switch SW1. In this method (a), if the predetermined value of $-\Delta V_X$ is set too large, the battery will be overcharged and the battery temperature will increase excessively, thus shortening battery life.

Figure 4:
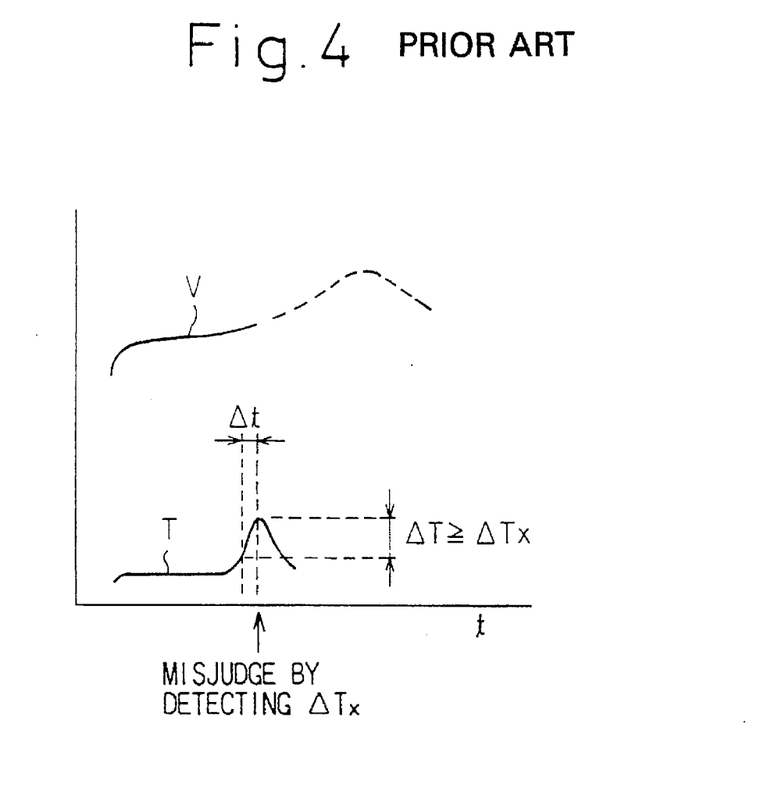
FIG. 4 shows battery charging characteristics of a second known method which detects completion of battery charging by detecting $\Delta T/\Delta t$.
Figure 5:
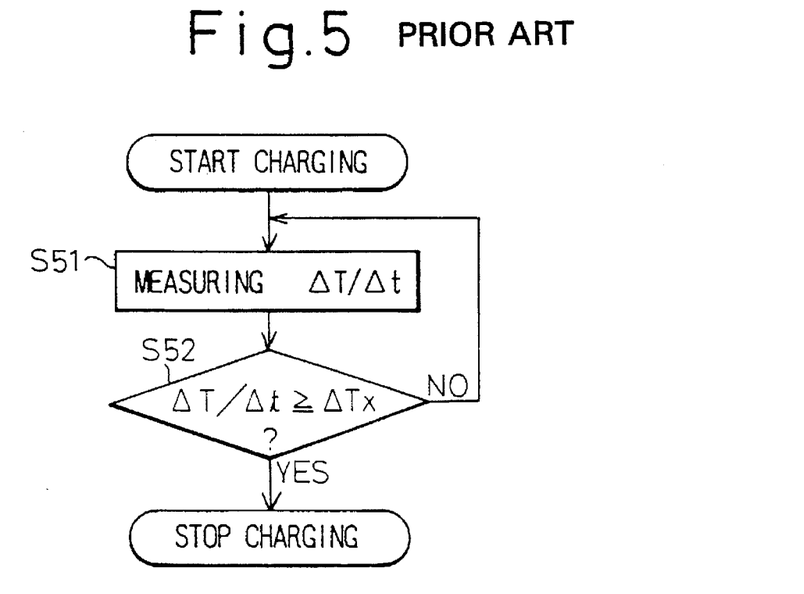
FIG. 5 is a flowchart for explaining a process of the second known method.

FIG. 4 shows battery charging characteristics of the above method (b). This method judges the completion of the battery charging by detecting a phenomenon wherein the battery temperature increases rapidly when the charging is completed. That is, as shown in the flowchart of FIG. 5, after starting the battery charging, the increase in battery temperature per unit time $\Delta T/\Delta t$ is measured at a step S51. At a step S52, it is judged whether or not the value of $\Delta T/\Delta t$ is greater than or equal to a predetermined temperature-increase rate value $\Delta T_{X1}$. When the value of $\Delta T/\Delta t$ is not greater than or equal to the value of $\Delta T_{X1}$ (NO), the flow returns to the step S51. On the other hand, when the value of $\Delta T/\Delta t$ is over the value of $\Delta T_{X1}$ (YES), it is judged that the battery is completely charged, and the charging is stopped by opening the switch SW1. In this method (b), if ambient temperature increases while the battery is being charged, the battery temperature also increases as shown in FIG. 4. Therefore, the increased ambient temperature may be erroneously detected as indicating that the battery is completely charged.

Figure 6:
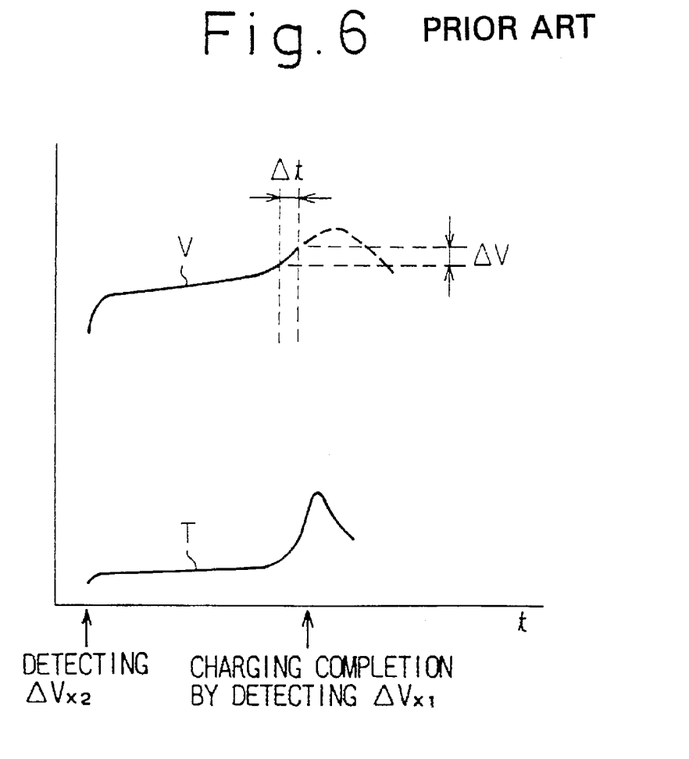
FIG. 6 shows battery charging characteristics of a third known method which detects completion of battery charging by detecting ΔV/Δt.
Figure 7:
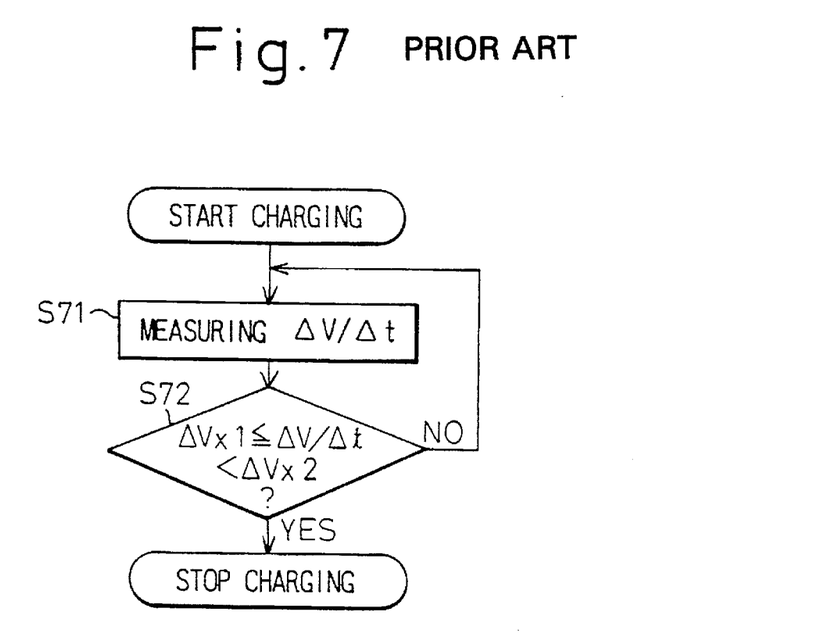
FIG. 7 is a flowchart for explaining a process of the third known method.

FIG. 6 shows battery charging characteristics of the above method (c). As the battery is being charged, the charge in voltage per unit time $\Delta V/\Delta t$ increases rapidly at the beginning and end of the charging. The voltage-increase rate at the beginning $\Delta V_{X2}$ and voltage-increase rate at the end of the charging $\Delta V_{X1}$ have the relationship of $\Delta V_{X1} < \Delta V_{X2}$. In this method (c), when the value of $\Delta V/\Delta t$ is between $\Delta V_{X1}$ and $\Delta V_{X2}$, it is judged that the battery is completely charged. That is, as shown in the flowchart of FIG. 7, after starting the charging, the value of $\Delta V/\Delta t$ is measured at a step S71. At a step S72, it is judged whether or not $\Delta V_{X1} \leq \Delta V/\Delta t < \Delta V_{X2}$. If this relationship is not satisfied (NO), the flow returns to the step S71. On the other hand, when this relationship is satisfied (YES), it is judged that the charging is complete, and the charging is stopped by opening the switch SW1. In this method (c), the increased battery voltage when starting the battery charging may be erroneously detected as indicating that the battery is completely charged.

Figure 8:
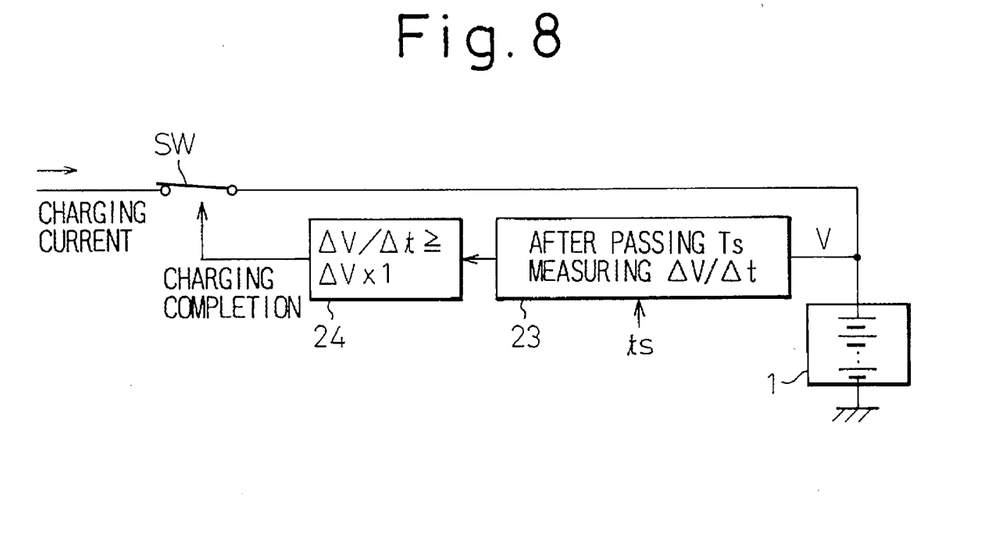
FIG. 8 is a block diagram of an example of the battery charging circuit according to the first aspect of the present invention.

FIG. 8 is a block diagram of an example of the battery charging circuit according to the first aspect of the invention. In the figure, a battery 1 is connected to a constant current source (not shown) via a switch SW. The battery starts charging when the switch SW is closed. Measuring means 23 measures a charge in battery voltage per unit time ($\Delta V/\Delta t$) after a predetermined time $t_S$ has passed since closing the switch SW, and judging means 24 judges whether or not the value of $\Delta V/\Delta t$ is greater than or equal to a predetermined value $\Delta V_{X1}$. If the value of $\Delta V/\Delta t$ is greater than or equal to the value of $\Delta V_{X1}$, the judging means 24 opens the switch SW.

Figure 9:
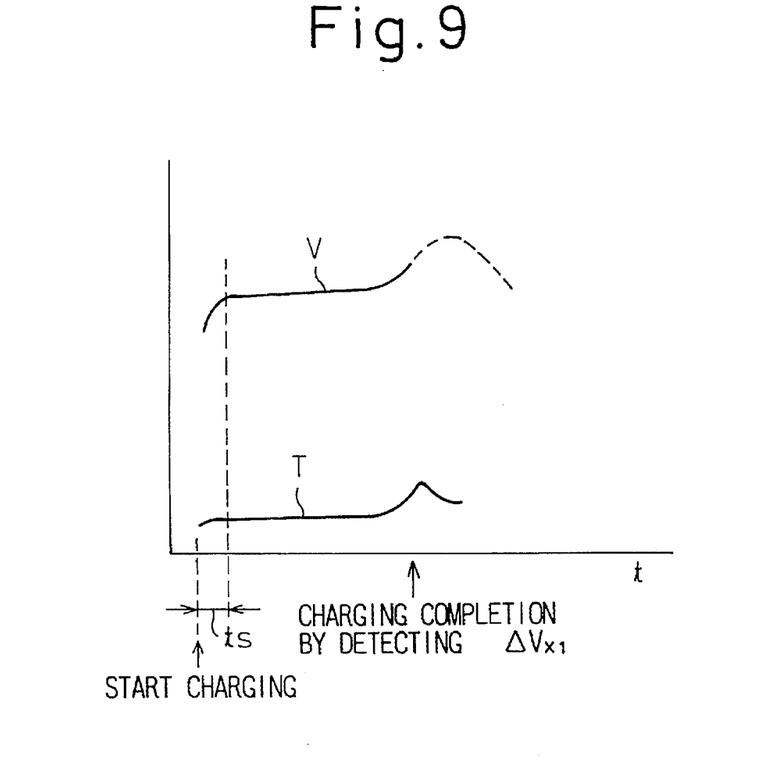
FIG. 9 shows battery charging characteristics of the circuit of FIG. 8.
Figure 10:
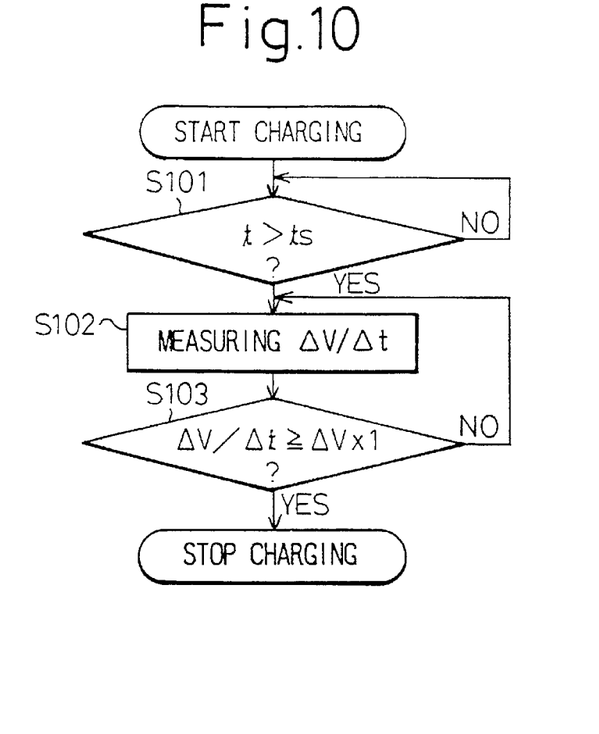
FIG. 10 is a flowchart for explaining a process of the circuit of FIG. 8.

The operation of the above circuit will be explained with reference to FIG. 9 and FIG. 10. Battery voltage V and battery temperature T change values as shown in FIG. 9 from the start of the battery charging by closing the switch SW. After starting, the flow waits for a predetermined time $t_S$ at a step S101. After the predetermined time $t_S$ has passed, the measuring means 23 measures the value of ($\Delta V/\Delta t$) at a step S102. The judging means 24 judges whether or not the value of $\Delta V/\Delta t$ is greater than or equal to a predetermined value $\Delta V_{X1}$ at a step S103. If the value of $\Delta V/\Delta t$ is not greater than or equal to the value of $\Delta V_{X1}$ (NO), the flow returns to the step S101. On the other hand, when the value of $\Delta V/\Delta t$ is over the value of $\Delta V_{X1}$ (YES), the process ends by judging that the battery is completely charged, and the judging means 24 stops the battery charging by opening the switch SW.

In this example, the value of $\Delta V/\Delta t$ at the start of the battery charging is not measured and is therefore not mistakenly judged as the completion of the battery charging. Therefore, the battery charging can be stopped just before the battery is completely charged and the battery life can be extended.

Figure 11:
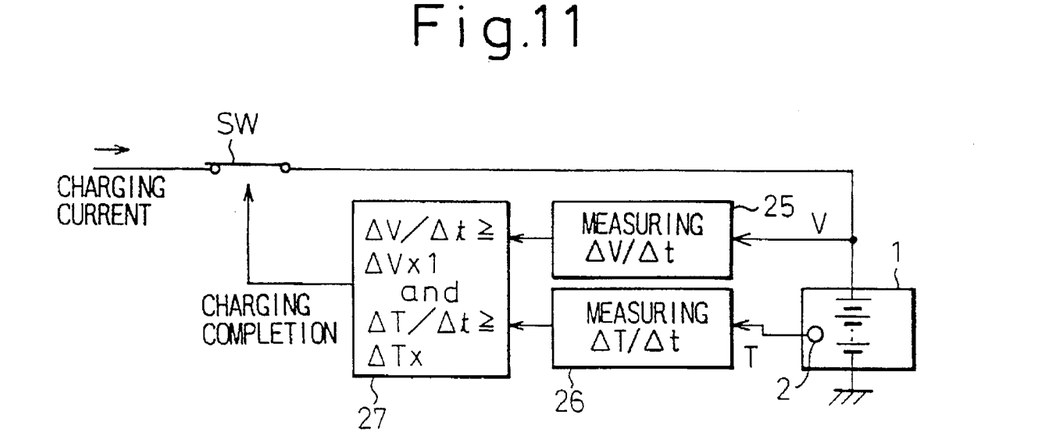
FIG. 11 is a block diagram of an example of the battery charging circuit according to the second aspect of the present invention.

FIG. 11 is a block diagram of an example of the battery charging circuit according to the second aspect of the invention. In the figure, the battery 1 is connected to a constant current source via the switch SW. First measuring means 25 measures the value of $\Delta V/\Delta t$, and second measuring means 26 measures a change in battery temperature per unit time $\Delta T/\Delta t$ using a temperature sensor 2. Judging means 27 judges whether or not both $\Delta V/\Delta t$ and $\Delta T/\Delta t$ are greater than or equal to predetermined values of $\Delta V_{X1}$ and $\Delta T_{X1}$, respectively. When both of the values of $\Delta V/\Delta t$ and $\Delta T/\Delta t$ are greater than or equal to the values of $\Delta V_{X1}$ and $\Delta T_{X1}$, the judging means 27 opens the switch SW.

Figure 12:
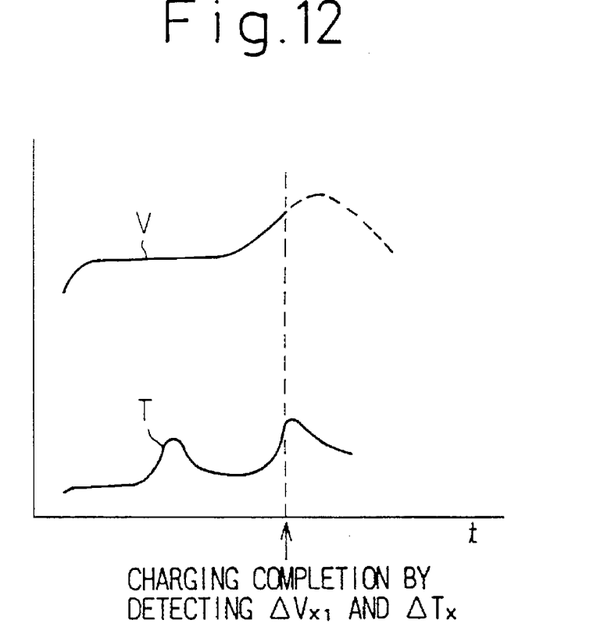
FIG. 12 shows battery charging characteristics of the circuit of FIG. 11.
Figure 13:
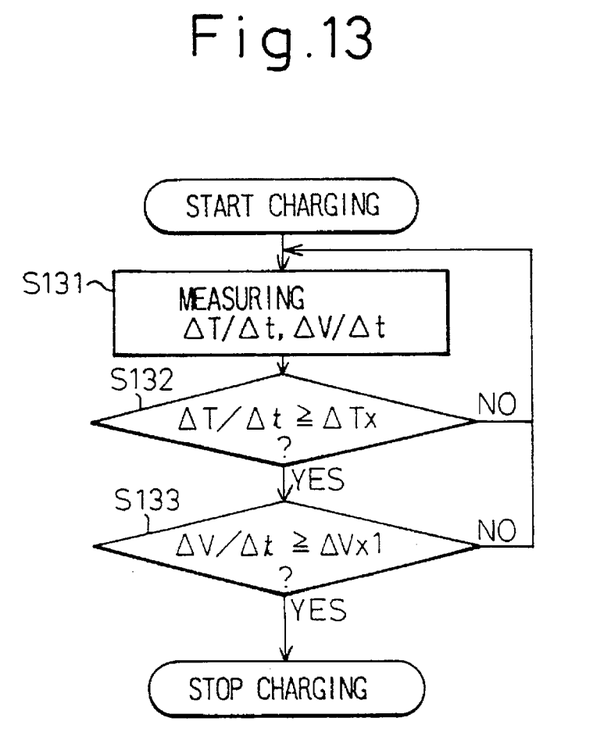
FIG. 13 is a flowchart for explaining a process of the circuit of FIG. 11.

The process of the above-mentioned circuit will be explained with reference to FIG. 12 and FIG. 13. After the battery charging is started by closing the switch SW, battery voltage V and battery temperature T change as shown in FIG. 12. In FIG. 12, it is also shown that the battery temperature T changes with a change in ambient temperature at a time far before the completion of the battery charging. After the battery charging starts, the first measuring means 25 and the second measuring means 26 measure the values of $\Delta V/\Delta t$ and $\Delta T/\Delta t$, respectively, at a step S131. The judging means 27 judges whether or not $\Delta T/\Delta t$ is greater than or equal to a predetermined value $\Delta T_x$ at a step S132. When $\Delta T/\Delta t$ is not greater than or equal to the value of $\Delta T_x$ (NO), the flow returns to the step S131. On the other hand, when $\Delta T/\Delta t$ is greater than or equal to the value $\Delta T_x$ (YES), the flow proceeds to a step S133. The judging means 27 judges whether or not $\Delta V/\Delta t$ is greater than or equal to a predetermined value (less than) $\Delta V_{X1}$ at the step S133.

When $\Delta V/\Delta t$ is not greater than or equal to the value $\Delta V_{X1}$ (NO), the flow returns to the step S131. On the other hand, when the value of $\Delta V/\Delta t$ is greater than or equal to the value $\Delta V_{X1}$ (YES), the process ends by judging that the battery is completely charged, and the judging means 27 stops the battery charging by opening the switch SW.

In this example, even if $\Delta V/\Delta t$ is greater than or equal to the predetermined value at the start of the battery charging, the judging means 27 does not open the switch SW because $\Delta T/\Delta t$ is small at the start of the battery charging. And even if the value of $\Delta T/\Delta t$ is greater than or equal to the predetermined value due to a change in the ambient temperature before completion of the battery charging, the judging means 27 does not open the switch SW because $\Delta V/\Delta t$ is small at the time. Only when both $\Delta V/\Delta t$ and $\Delta T/\Delta t$ are greater than or equal to the predetermined value at the same time, is it judged that the battery is completely charged. Therefore, the battery charging can be stopped just before the battery is completely charged and the battery life can be extended.

Figure 14:
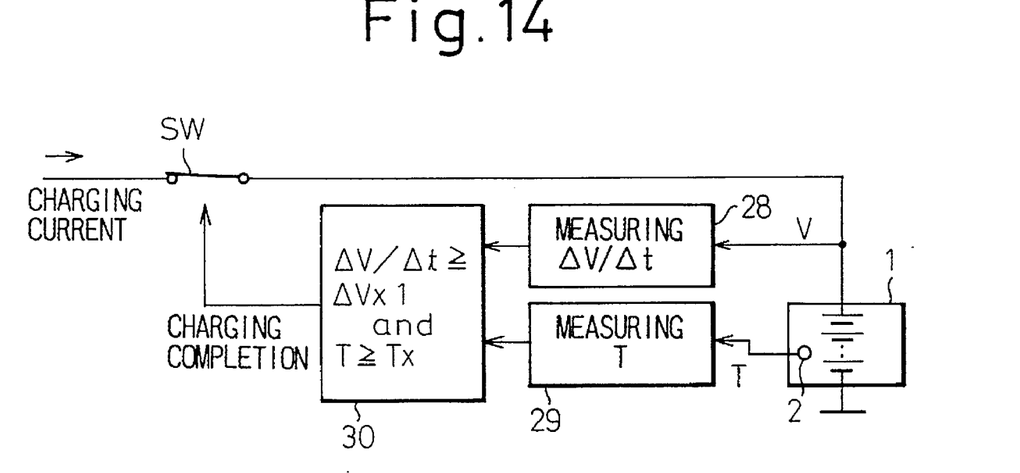
FIG. 14 is a block diagram of an example of the battery charging circuit according to the third aspect of the present invention.

FIG. 14 is a block diagram of an example of the battery charging circuit according to the third aspect of the invention. In the figure, the battery 1 is connected to the constant current source via the switch SW. First measuring means 28 measures the value $\Delta V/\Delta t$, and second measuring means 29 measures the temperature T using a temperature sensor 2. Judging means 30 judges whether or not both $\Delta V/\Delta t$ and T are greater than or equal to predetermined values $\Delta V_{X1}$ and $T_X$, respectively. When both $\Delta V/\Delta t$ and T are respectively greater than or equal to $\Delta V_{X1}$ and $T_X$ at the same time, the judging means 30 opens the switch SW.

Figure 15:
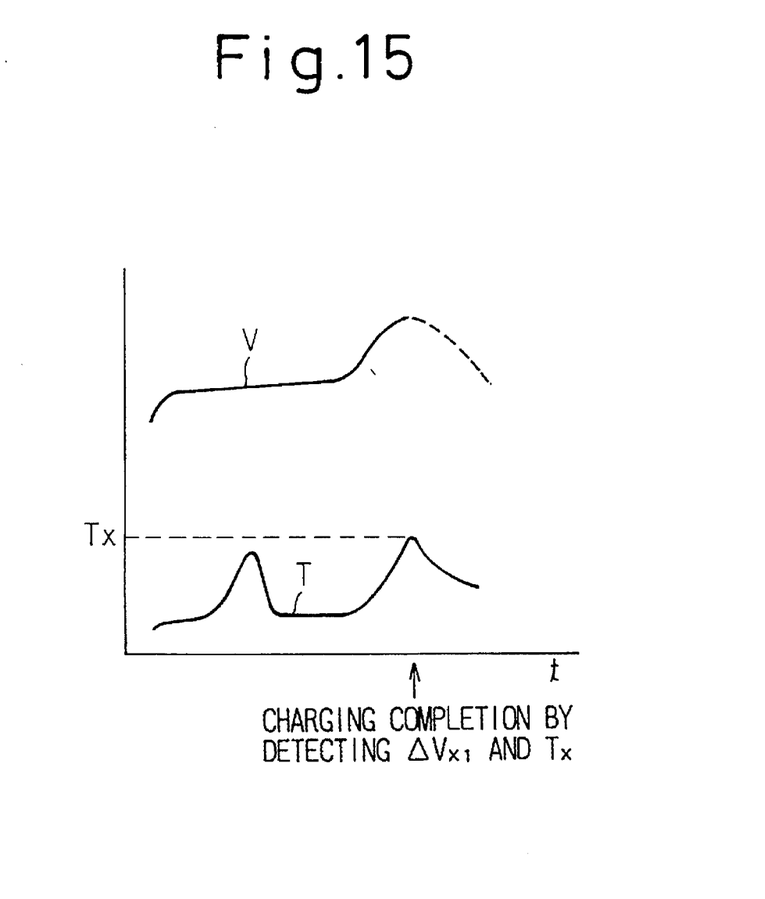
FIG. 15 shows battery charging characteristics of the circuit of FIG. 14.
Figure 16:
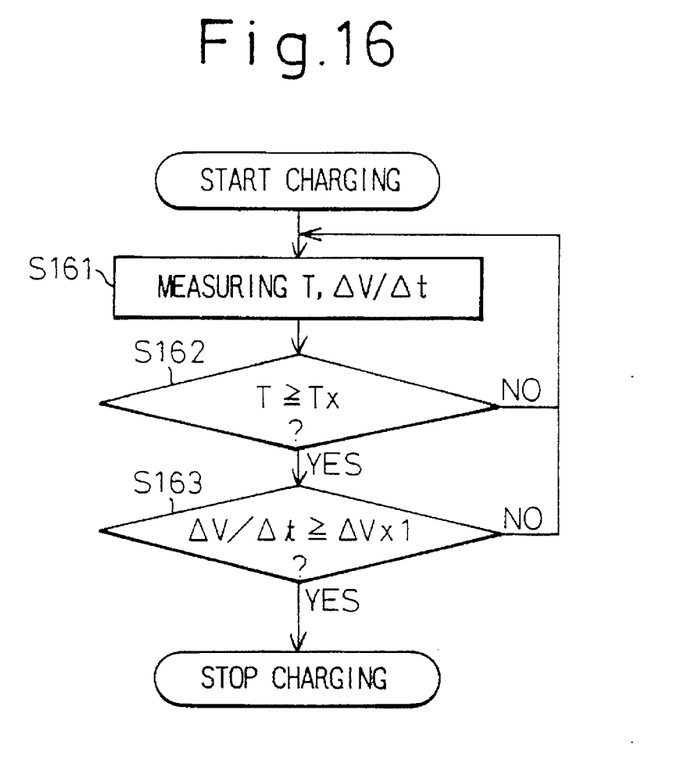
FIG. 16 is a flowchart for explaining a process of the circuit of FIG. 14.

The process of the above-mentioned circuit will be explained with reference to FIG. 15 and FIG. 16. After the battery charging is started by closing the switch SW, the battery voltage V and battery temperature T change values as shown in FIG. 15. In FIG. 15, it is also shown that the battery temperature changes at a time far before the completion of the battery charging with a change in ambient temperature. After the battery charging is started by closing the switch SW, the first measuring means 28 and the second measuring means 29 respectively measure the values of $\Delta V/\Delta t$ and T at a step S161. The judging means 30 judges whether or not T is greater than or equal to a predetermined value $T_X$ at a step S162. When the value of T is not greater than or less than the value of $T_X$ (NO), the flow returns to the step S161. On the other hand, when the value of T is greater than or less than the value of $T_X$ (YES), the flow proceeds to a step S163. The judging means 10 judges whether or not the value of $\Delta V/\Delta t$ is greater than or less than the value of $\Delta V_{X1}$ at a step S163. When the value of $\Delta V/\Delta t$ is not greater than or less than the value of $\Delta V_{X1}$ (NO), the flow returns to the step S161. On the other hand, when the value of $\Delta V/\Delta t$ is greater than or less than the value of $\Delta V_{X1}$ (YES), the process ends by judging that the battery is completely charged, and the judging means 30 stops the battery charging by opening the switch SW.

In this example, even if the value of $\Delta V/\Delta t$ is greater than or equal to the predetermined value at the start of the battery charging, the judging means 30 does not open the switch SW because the ambient temperature is not high (i.e., $T<T_X$). And, even if the value of T is greater than or equal to the predetermined value due to a change in the ambient temperature before completion of the charging, the judging means 30 does not open the switch SW because the battery voltage does not change rapidly (i.e., $\Delta V/\Delta t<\Delta V_{X1}$). Only when both $\Delta V/\Delta t$ and $\Delta T/\Delta t$ are greater than or equal to the predetermined value at the same time, is it judged that the battery is completely charged. Therefore, the battery charge can be stopped just before the battery is completely charged and the battery life can be extended.

Figure 17:
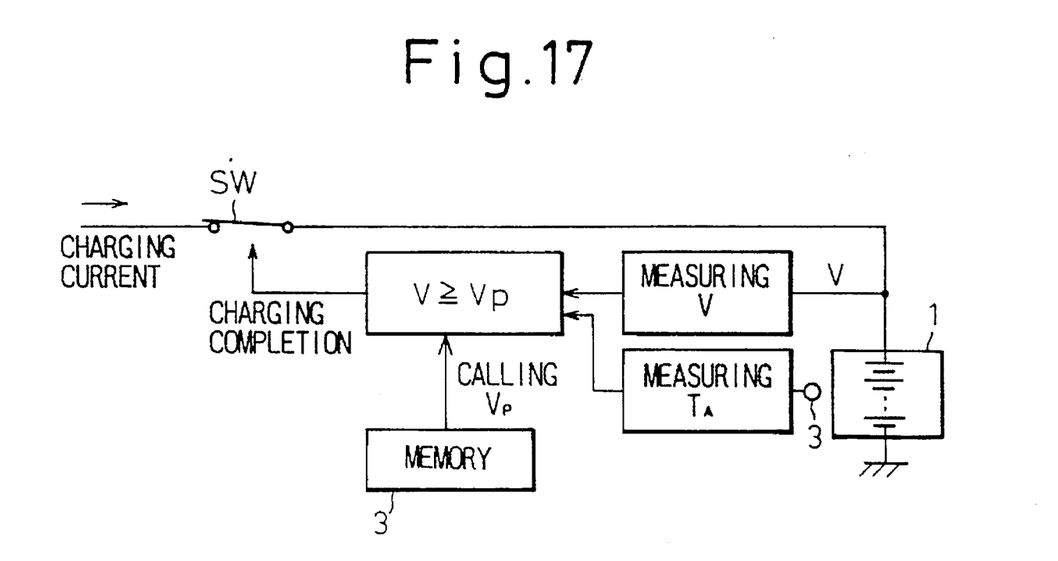
FIG. 17 is a block diagram of an example of the battery charging circuit according to the fourth aspect of the invention.
Figure 18:
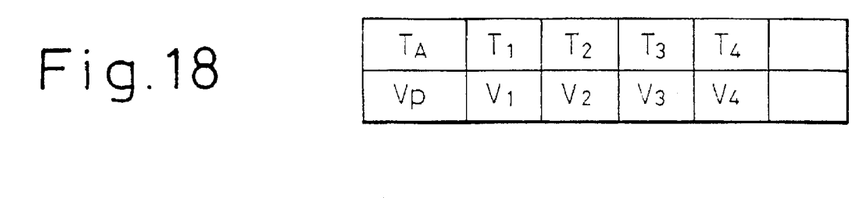
FIG. 18 is a table used by a memory in the circuit of FIG. 17.

FIG. 17 is a block diagram of an example of the battery charging circuit according to the fourth aspect of the invention. In the figure, the battery 1 is connected to the constant current source via the switch SW. First measuring means 31 measures the battery voltage V, and second measuring means 32 measures the ambient temperature $T_A$ using a temperature sensor 3. A non-volatile memory 33 stores maximum battery voltage values $V_P$ during the battery charging period. In general, if a type of battery, a battery manufacturer, etc., are specified, the maximum battery voltage $V_P$ need only depend on the ambient temperature $T_A$. In this example, tables are stored in the memory 33. One of the tables is shown in FIG. 18, which shows a relationship between $V_P$ and $T_A$. The tables are prepared for all types of batteries, battery makers, etc. Before starting the battery charging, the type of battery, battery maker, etc., are designated and a corresponding table is designated.

Judging means 34 reads out the value of $V_P$ from the table in the memory 33 in accordance with the value of $T_A$, and judges whether or not the value of V is over the value of $V_P$. When the value of V is over the value of $V_P$, the judging means 34 opens the switch SW.

Figure 19:
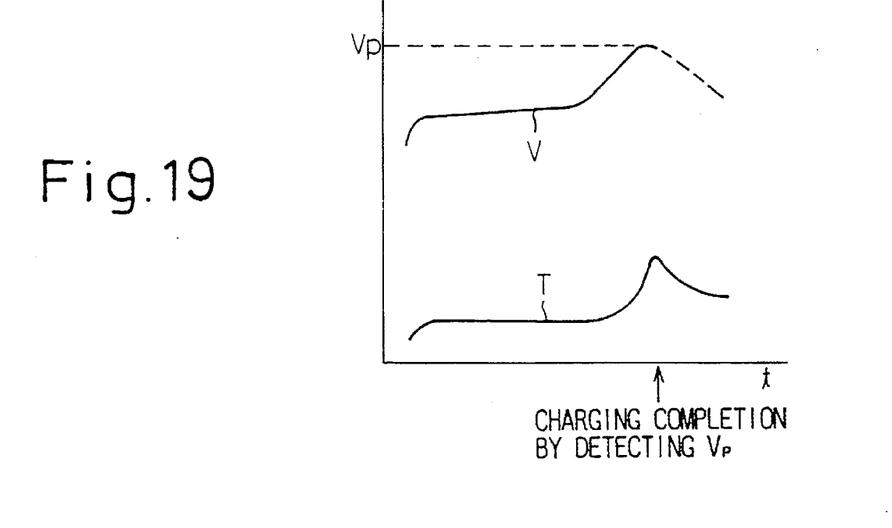
FIG. 19 shows battery charging characteristics of the circuit of FIG. 17.
Figure 20:
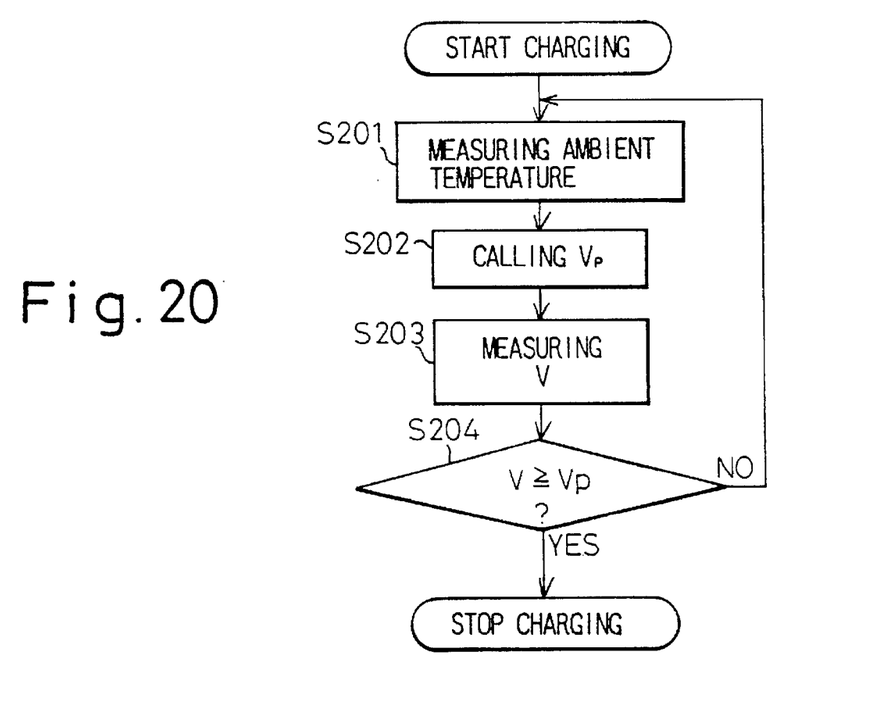
FIG. 20 is a flowchart for explaining a process of the circuit of FIG. 17.

The process of the above-mentioned circuit will be explained by referring to FIG. 19 and FIG. 20. After the battery charging is started by closing the switch SW, the voltage V and the temperature T of the battery 1 change values as shown in FIG. 19, and the second measuring means 32 measures the ambient temperature $T_A$ at a step S201. The judging means 34 reads out the value of $V_P$ from the designated table in accordance with the value of $T_A$ at a step S202. The first measuring means 31 measures the battery voltage V at a step S203. The judging means 33 judges whether or not the value of V is greater than or equal to (less than) the value of $V_P$ at a step S204. When the value of V is not over the value of $V_P$ (NO), the flow returns to the step S201. On the other hand, when the value of V is greater than or equal to the value of $V_P$, (YES), the process ends by judging that the battery is completely charged, and the judging means 34 stops the battery charging by opening the switch SW.

In this example, a reference value or the maximum battery voltage $V_P$ takes into account the influence of the ambient temperature, so the judgment of the completion of the battery charging is not affected by the ambient temperature. Therefore, the battery charging can be stopped just before the battery is completely charged, so that the battery life can be extended.

Figure 21:
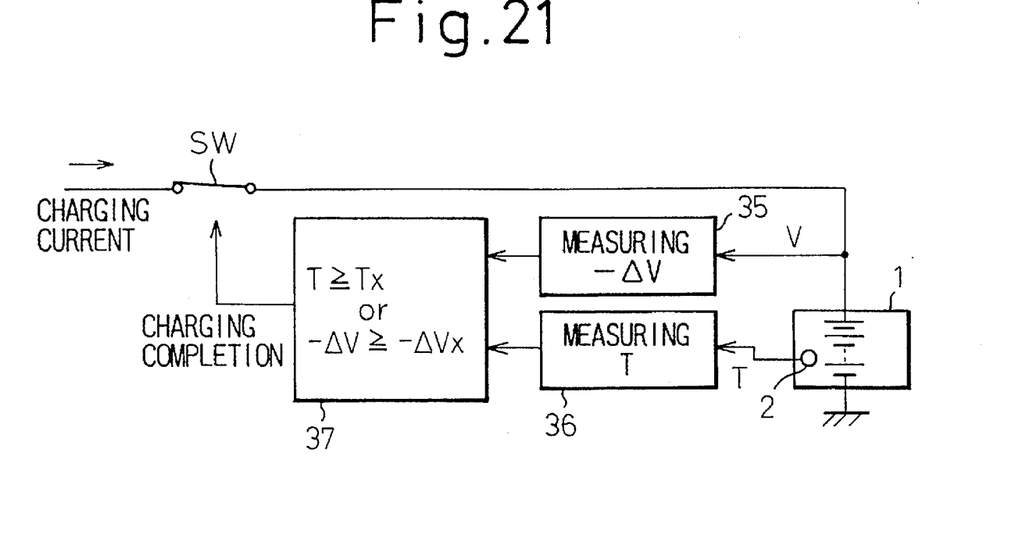
FIG. 21 is a block diagram of an example of the battery charging circuit according to the fifth aspect of the present invention.

FIG. 21 is a block diagram of an example of the battery charging circuit according to the fifth aspect of the invention. In the figure, the battery 1 is connected to the constant current source via the switch SW. First measuring means 35 measures a decrease in voltage $-\Delta V$ from the maximum battery voltage during the battery charging period, and second measuring means 36 measures temperature T of the battery 1 using a temperature sensor 2. A judging means 37 judges whether or not either $-\Delta V$ or T is greater than or equal to predetermined values $-\Delta V_X$ and $T_X$, respectively. When either $-\Delta V$ or T is greater than or equal to $-\Delta V_X$ or $T_X$, the judging means 30 opens the switch SW.

Figure 22:
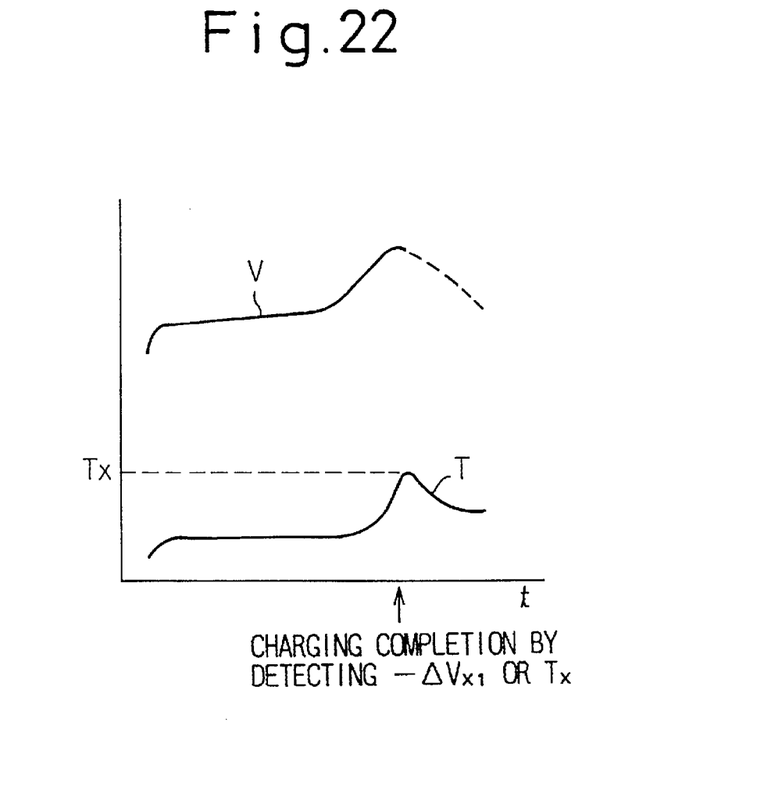
FIG. 22 shows battery charging characteristics of the circuit of FIG. 20.
Figure 23:
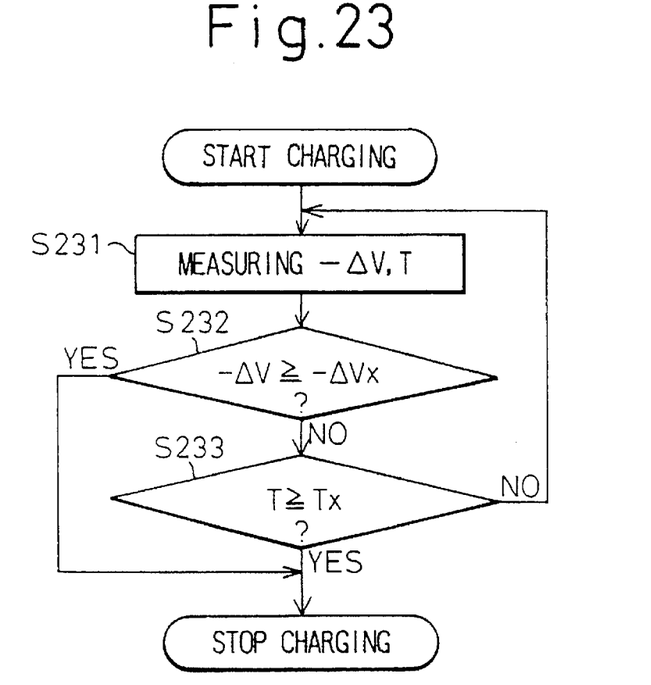
FIG. 23 is a flowchart for explaining a process of the circuit of FIG. 20.

The operation of the above circuit will be explained with reference to FIG. 22 and FIG. 23. After the battery charging is started by closing the switch SW, voltage V and battery temperature T change values as shown in FIG. 22. The first measuring means 35 and the second measuring means 36 measure the values of $-\Delta V$ and T, respectively at a step S231. The judging means 37 judges whether or not $-\Delta V$ is greater than or equal to $-\Delta V_X$ at the step S232. When $-\Delta V$ is not greater than or equal to (less than) $-\Delta V_X$ (NO), the flow proceeds to a step S233. On the other hand, when $-\Delta V$ is greater than or equal to $-\Delta V_X$ (YES), the process ends by judging that the battery is completely charged. At the step S233, the judging means 37 judges whether or not the value of T is greater than or equal to a predetermined value $\Delta T_X$. When the value of T is not greater than or equal to (less than) $T_X$ (NO), the flow returns to the step S231. On the other hand, when the value of T is greater than or equal to the value of $T_x$ (YES), the process ends by judging that the battery is completely charged, and the judging means 37 stops the battery charging by opening the switch SW.

In this example, by measuring the battery temperature T, the battery charging can be stopped just before the battery is completely charged. If the completion of the battery charging is erroneously detected by measuring the battery temperature T, the completion of the battery charging can still be detected correctly by measuring a decrease in battery voltage from the maximum voltage $-\Delta V$. Therefore, overcharging can be prevented, and the battery life can be extended.

Figure 24:
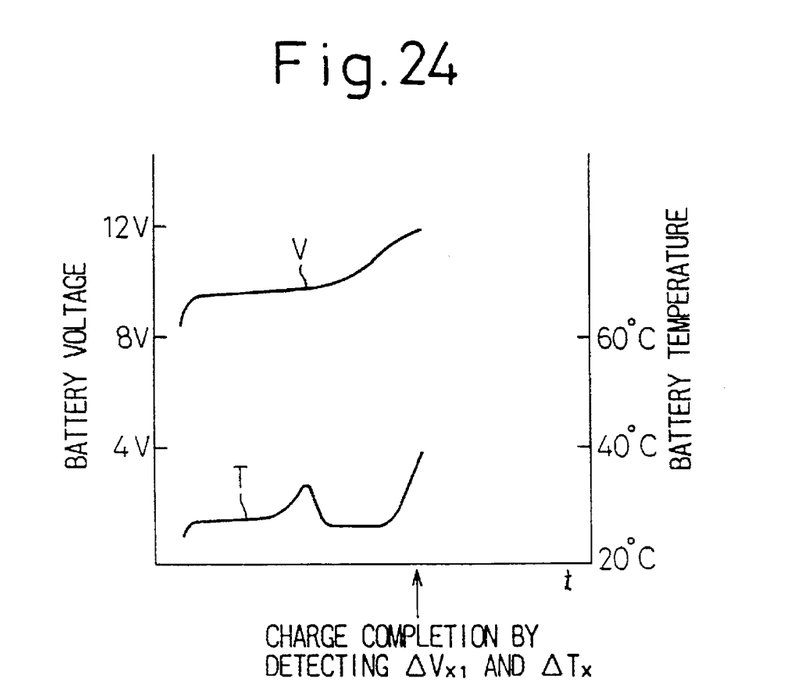
FIG. 24 shows charge characteristics in the case of applying the circuit of FIG. 11 to charge a NiMH (Nickel-Metal Hydride) battery.

FIG. 24 shows battery charging characteristics in the case of applying the circuit of FIG. 11 to charging a NiMH battery.

The battery charging characteristics shown in the figure were obtained by the following conditions.

NiMH battery 8 series connected cells

Nominal voltage 1.2 V×8=9.6 V

Nominal capacity 1,100 mAh

Ambient temperature 25° C.

Charging current 1 C (Current for charging to nominal capacity in an hour. In this case, 1,100 mA)

$\Delta V_{X1}$=60 mV/min $\Delta T_X$=1° C./min

FIG. 24 shows that the battery temperature T changes during the battery charging period due to a change in the ambient temperature. At that time, the change in battery temperature $\Delta T/\Delta t$ is measured, but the value of $\Delta V/\Delta t$ does not change. Therefore, the battery charging is continued. When the battery charging is completed, both $\Delta T/\Delta t$ and $\Delta V/\Delta t$ are greater than or equal to the values of $\Delta V_{X1}$ and $\Delta T_X$, respectively, and the battery charging is stopped.

I claim:

1. A method for controlling a constant current battery charging method which charges a secondary battery in a short time, comprising the steps of:

measuring a change in battery voltage per unit time $\Delta V/\Delta t$;

measuring a change in battery temperature per unit time $\Delta T/\Delta t$;

stopping the battery charging when both the change in battery voltage per unit time $\Delta V/\Delta t$ and the change in battery temperature per unit time $\Delta T/\Delta t$ are at least as great as a predetermined change in battery voltage per unit time $\Delta V_{X1}$ and a predetermined change in battery temperature per unit time $\Delta T_X$, respectively.

2. A method for controlling a constant current battery charging method which charges a secondary battery in a short time, comprising the steps of:

measuring a change in battery voltage per unit time $\Delta V/\Delta t$;

measuring battery temperature T;

stopping the battery charging when both the change in battery voltage per unit time $\Delta V/\Delta t$ and the battery temperature T are at least as great as a predetermined change in battery voltage per unit time $\Delta V_{X1}$ and a predetermined temperature $T_X$.

3. An apparatus for controlling a constant current battery charging method which charges a secondary battery in a short time, comprising:

first measuring means for measuring a change in battery voltage per unit time $\Delta V/\Delta t$;

second measuring means for measuring a change in battery temperature per unit time $\Delta T/\Delta t$;

judging means for stopping the battery charging when it is judged that both the change in battery voltage per unit time $\Delta V/\Delta t$ and the change in battery temperature per unit time $\Delta T/\Delta t$ are at least as great as a predetermined change in battery voltage per unit time $\Delta V_{X1}$ and a predetermined change in battery temperature per unit time $\Delta T_X$, respectively.

4. An apparatus for controlling a constant current battery charging method which charges a secondary battery in a short time, comprising:

first measuring means for measuring a change in battery voltage per unit time $\Delta V/\Delta t$;

second measuring means for measuring battery temperature T;

judging means for stopping the battery charging when it is judged that both the change in battery voltage per unit time $\Delta V/\Delta t$ and said battery temperature T are at least as great as a predetermined change in battery voltage per unit time $\Delta V_{X1}$ and a predetermined temperature $T_X$.

* * * * *

UNITED STATES PATENT AND TRADEMARK OFFICE
CERTIFICATE OF CORRECTION

PATENT NO. : 5,627,451
DATED : May 6, 1997
INVENTOR(S) : TAKEDA

It is certified that error appears in the above-identified patent and that said Letters Patent is hereby corrected as shown below:

Col. 1,   line 50, after "overcharged" insert --,--.

Col. 2,   line 12, change "the" (first occurrence) to --a--;
          line 21, change "a" to --the--;
          line 22, change "the" (first occurrence) to --a--.

Col. 4,   line 44, change "over" to --greater than or equal to--;
          line 61, change "$\Delta V \Delta/t$" to --$\Delta V/\Delta t$--.

Col. 5,   line 27, change "over" to --greater than or equal to--;
          line 44, change "AT/At" to --$\Delta T/\Delta t$--;
          line 67, delete "(less than)".

Col. 6,   line 1, after "equal to" insert --(less than)--;
          line 45, change "less than" to --equal to (less than)--;
          line 47, change "less than" to --equal to--;
          line 49, change "less than" to --equal to--;
          line 51, change "less than" to --equal to (less than)--;
          line 53, change "less than" to --equal to--;
          line 66, change "$\Delta V/\Delta t$ and $\Delta T/\Delta t$" to --$\Delta V/\Delta t$ and T--;
          line 67, change "predetermined value" to --respective predetermined values--.

Col. 7,   line 37, delete "(less than)";
          line 38, change "over" to --greater than or equal to (less than)--;
          line 40, delete "," (first occurrence).

UNITED STATES PATENT AND TRADEMARK OFFICE
CERTIFICATE OF CORRECTION

PATENT NO. : 5,627,451
DATED : May 6, 1997
INVENTOR(S) : TAKEDA

It is certified that error appears in the above-identified patent and that said Letters Patent is hereby corrected as shown below:

Col. 8, line 2, after "respectively" insert --,--.

Signed and Sealed this

Twenty-eighth Day of October, 1997

Attest:

BRUCE LEHMAN

Attesting Officer          Commissioner of Patents and Trademarks